United States Patent
Walker et al.

(10) Patent No.: US 11,174,111 B2
(45) Date of Patent: Nov. 16, 2021

(54) APPARATUS AND SYSTEM FOR TRANSFERRING MATERIALS AND CORRESPONDING METHOD OF USE THEREOF

(71) Applicant: JM TECHNOLOGIES LLC, Gallatin, TN (US)

(72) Inventors: Michael Walker, Gallatin, TN (US); James Ekholm, Alvarado, MN (US)

(73) Assignee: JM Technologies LLC, Gallatin, TN (US)

(*) Notice: Subject to any disclaimer, the term of this patent is extended or adjusted under 35 U.S.C. 154(b) by 0 days.

(21) Appl. No.: 16/762,714

(22) PCT Filed: Nov. 8, 2018

(86) PCT No.: PCT/US2018/059745
§ 371 (c)(1),
(2) Date: May 8, 2020

(87) PCT Pub. No.: WO2019/094541
PCT Pub. Date: May 16, 2019

(65) Prior Publication Data
US 2020/0346877 A1    Nov. 5, 2020

Related U.S. Application Data

(60) Provisional application No. 62/583,200, filed on Nov. 8, 2017.

(51) Int. Cl.
*B65G 53/14* (2006.01)
*B65G 53/42* (2006.01)
(Continued)

(52) U.S. Cl.
CPC ............. *B65G 53/42* (2013.01); *B65G 53/24* (2013.01); *B65G 53/14* (2013.01); *B65G 2201/042* (2013.01); *B67D 7/06* (2013.01)

(58) Field of Classification Search
USPC ..... 406/93, 94, 95, 113, 114, 115, 116, 117, 406/152, 153, 192, 194, 195, 198;
(Continued)

(56) References Cited

U.S. PATENT DOCUMENTS

| | | | | |
|---|---|---|---|---|
| 1,416,013 A | * | 5/1922 | Gieseler | B65G 53/42 406/152 |
| 1,508,521 A | * | 9/1924 | Kreuser | E02F 3/92 37/318 |

(Continued)

OTHER PUBLICATIONS

International Search Report and Written Opinion of corresponding International Patent Application No. PCT/US2018/059745, dated Feb. 22, 2019, 14 pages.

(Continued)

*Primary Examiner* — Joseph A Dillon, Jr.
(74) *Attorney, Agent, or Firm* — Patterson Intellectual Property Law, P.C.; Grant Ford

(57) ABSTRACT

A vacuum nozzle includes a main body (12) and at least one auxiliary body (22). The main body has a first open end (16) and a second open end (18). The first open end is coupleable to a vacuum hose (2) and the second open end is configured for receiving materials to be transferred. The auxiliary body (130) has a first auxiliary opening (136) and a second auxiliary opening (138). The first auxiliary opening is positioned closer to the first open end of the main body than the second open end of the main body. The second auxiliary opening covers a portion of the second open end of the main body. The auxiliary body provides a dedicated auxiliary passageway for providing a consistent flow of air to the second open end of the main body when the vacuum nozzle is in use.

15 Claims, 6 Drawing Sheets

(51) Int. Cl.
   *B65G 53/24* (2006.01)
   *B67D 7/06* (2010.01)
(58) Field of Classification Search
   USPC .................................. 239/270; 15/322, 419
   See application file for complete search history.

(56) References Cited

U.S. PATENT DOCUMENTS

| | | | | |
|---|---|---|---|---|
| 2,744,792 A * | 5/1956 | Finn | ...................... | B65G 53/42 406/48 |
| 2,970,865 A * | 2/1961 | Finnegan | ............... | B65G 53/42 406/152 |
| 3,219,394 A | 11/1965 | Moss et al. | | |
| 3,233,463 A * | 2/1966 | Kaufmann | ............... | G01N 1/08 73/864.33 |
| 3,273,401 A * | 9/1966 | Kaufmann | ............... | G01N 1/08 73/864.33 |
| 3,301,606 A * | 1/1967 | Bruno | ...................... | E02F 3/92 406/85 |
| 3,638,741 A * | 2/1972 | Zizak | ...................... | E21B 21/12 175/215 |
| 3,654,662 A * | 4/1972 | Bates | ...................... | A47L 11/34 15/302 |
| 3,958,298 A * | 5/1976 | Cannan | ................... | A47L 11/34 15/322 |
| 4,333,203 A * | 6/1982 | Yonkers | .................. | A47L 11/30 15/321 |
| 4,335,486 A * | 6/1982 | Kochte | ................... | A47L 11/34 15/321 |
| 4,488,330 A * | 12/1984 | Grave | ..................... | A47L 11/34 15/322 |
| 4,551,042 A * | 11/1985 | Hagedorn | ............. | B65G 53/30 406/93 |
| 4,649,594 A | 3/1987 | Grave | | |
| 4,654,925 A * | 4/1987 | Grave | ..................... | A47L 11/30 15/322 |
| 4,720,889 A * | 1/1988 | Grave | ..................... | A47L 11/30 15/322 |
| 4,812,086 A * | 3/1989 | Kopernicky | ........... | B65G 53/42 406/106 |
| 4,961,245 A * | 10/1990 | Barnes, Jr. | ............ | A47L 9/0072 15/339 |
| 4,973,203 A | 11/1990 | Oftedal | | |
| 4,976,005 A | 12/1990 | Graye | | |
| 4,984,328 A * | 1/1991 | Berfield | ................... | A47L 11/30 15/321 |
| 5,001,806 A * | 3/1991 | Gurstein | ................... | A47L 9/02 15/246.2 |
| 5,157,805 A * | 10/1992 | Pinter | ..................... | A47L 11/34 15/321 |
| 5,195,852 A * | 3/1993 | Malugani | ............... | B65G 53/42 406/151 |
| 5,497,530 A * | 3/1996 | Kamm | ..................... | A47L 1/08 15/144.4 |
| 5,555,598 A * | 9/1996 | Grave | ..................... | A47L 11/34 15/322 |
| 5,613,272 A * | 3/1997 | Huffman | ................. | A47L 11/34 15/321 |
| 5,673,779 A * | 10/1997 | Spickelmire | .......... | B65G 53/42 193/30 |
| 5,741,093 A * | 4/1998 | Schonberg | ............. | B65G 53/24 406/153 |
| 6,012,975 A * | 1/2000 | Jager | ........................ | B24C 5/04 451/87 |
| 6,035,996 A * | 3/2000 | Swift | ..................... | B65G 45/22 198/495 |
| 6,050,392 A * | 4/2000 | Straub | .................... | B65G 45/22 198/495 |
| 6,051,076 A * | 4/2000 | Oechsle | .................... | D21F 1/32 134/144 |
| 6,254,315 B1 | 7/2001 | Pfeiffer | | |
| 6,352,393 B1 * | 3/2002 | Sanders | ................ | E02F 3/9206 175/215 |
| 6,364,959 B1 * | 4/2002 | Straub | .................... | B65G 45/22 100/151 |
| 6,923,601 B2 * | 8/2005 | Goth | ....................... | B65G 53/24 406/152 |
| 6,979,152 B2 * | 12/2005 | Bodie | .................... | B65G 53/42 15/415.1 |
| 7,708,504 B2 * | 5/2010 | Heckendorn | .......... | B65G 53/14 406/152 |
| 8,322,951 B2 * | 12/2012 | Kvalheim | ............. | B65G 65/36 406/109 |
| 8,533,907 B2 * | 9/2013 | Eccardt | ..................... | A47L 9/02 15/415.1 |
| 9,174,812 B2 * | 11/2015 | Harris | .................... | B65G 53/40 |
| 9,186,031 B2 * | 11/2015 | Studebaker | ............. | A47L 11/34 |
| 9,702,101 B1 * | 7/2017 | Ficks | ........................ | B08B 5/04 |
| 9,994,403 B2 * | 6/2018 | Logan | .................... | B65G 53/00 |
| 10,017,332 B2 * | 7/2018 | Carteri | .................... | B65G 53/24 |
| 10,238,255 B2 * | 3/2019 | Schultz | ..................... | A47L 9/02 |
| 10,413,147 B2 * | 9/2019 | Hopkins | ................. | A47L 11/408 |
| 10,668,596 B2 * | 6/2020 | Usui | ........................ | B24C 1/06 |
| 2003/0217783 A1 * | 11/2003 | Harris | .................... | B65G 53/34 141/67 |
| 2006/0272927 A1 * | 12/2006 | Baber | .................... | B65G 53/42 198/689.1 |
| 2010/0018536 A1 * | 1/2010 | Hershey | ................. | A61C 17/08 128/207.14 |

OTHER PUBLICATIONS

International Preliminary Report on Patentability of corresponding International Patent App. No. PCT/US2018/059745, dated May 22, 2020, 11 pages.

* cited by examiner

APPARATUS AND SYSTEM FOR TRANSFERRING MATERIALS AND CORRESPONDING METHOD OF USE THEREOF

TECHNICAL FIELD

The present disclosure relates generally bulk handling of grain, particulate, granular material, and/or liquid. More particularly, the present disclosure pertains to an improved nozzle for transferring materials using a vacuum apparatus.

BACKGROUND ART

Grain vacuums are used for removing particulates from storage bins or piles and for transferring the particulates to a transport device such a truck or trailer, and vice versa. Liquid vacuums are used for removing and transferring liquids from one place to another. These vacuum devices may utilize a vacuum engine or suction device which draws air and particulates or liquids ("materials") into an input, typically a long vacuum hose and an associated vacuum nozzle, and conveys the drawn air and materials to a storage device or output. The vacuum engine or suction device typically requires significant horsepower to drive a large fan or blower, particularly if the vacuum device is being used to move grain or other particulates a significant distance (e.g., greater than 30 meters), or up a significant height (e.g., greater than 10 meters). Requiring moving the materials a long distance or a great height can significantly impair the quality of suction at the input end of a vacuum hose. There is therefore a need to improve the effectiveness of such vacuum devices, vacuum hoses, and vacuum nozzles in these circumstances.

A typical vacuum nozzle is connected to the input end of a length of vacuum hose and includes a materials intake and an air inlet. The air inlet is usually located near the grain intake but not so close that materials are sucked into the air inlet. The air inlet provides the fan or blower of the vacuum with air to maintain suction at the input end and to provide high air speed within the vacuum hose. Materials may enter the air inlet if the nozzle is driven too deeply into the material or if the material shifts, causing the air inlet to become covered. This situation will affect the air flow and quality of suction.

A vacuum hose may pulsate during operation due to changes in the amount of air and amount of material being introduced into the vacuum hose via the vacuum nozzle. This pulsating may be further affected by the direction from which air enters the nozzle and the distance between the material intake and the air inlet. Pulsating may cause increased wear on the components of the vacuum such as the vacuum hose (e.g. based on vacuumed grain continuously contacting the same portion of the vacuum hose). A pulsating of the hose or nozzle also raises safety concerns, as it may cause grain or other particulates to shift or the operator to fall, leading to a dangerous working condition for the operator. There is, therefore, a need to reduce or eliminate hose pulsation and oscillation during operation.

A National Institute for Occupational Safety and Health (NIOSH) alert bulletin, Iowa FACE 981A035, issued in 1998 warned of fatal incidents occurring while vacuuming out grain bins. The NIOSH alert bulletin was specifically concerned with preventing worker death and injuries from engulfment caused by grain or particulate shifts occurring during vacuum extraction.

The Occupational Safety and Health Administration (OSHA) lists the grain handling industry as a high hazard industry. Most recently, OSHA cited a report issued by Purdue University stating that 51 workers were engulfed in 2010, 26 of which died—the highest number on record. OSHA warned of operators being pulled into grain funnel flows when the grain vacuum nozzle is place below the grain surface. OSHA further warned of the hazards of maneuvering the vacuum nozzle and associated hose, stating that grain shifts and avalanches can be caused by hose movement and operator falls.

Based on the continued risks and high number of deaths caused during grain vacuum operations, there is a need for better and safer equipment which also maintains or increases performance.

DISCLOSURE OF THE INVENTION

Accordingly, one object of the present disclosure is to provide an improved vacuum nozzle or adapter which permits grain, particulates, liquids, or other matter as well as inlet air to enter the vacuum nozzle intake at the same location, while moving the point of air collection further from the vacuum nozzle intake.

Advantageously, implementations consistent with the present disclosure also may provide an improved material flow, may reduce vacuum hose and nozzle pulsating, may improve operator safety during material extraction, and may allow for a vacuum nozzle or adapter to be inserted into places that are otherwise unsafe for human occupancy.

According to one aspect of the present disclosure, there is provided a vacuum nozzle for attachment to a vacuum hose of a particulate or liquid vacuum. The vacuum nozzle has a body having first and second open ends. The first open end may be configured to attach to a vacuum hose using a coupling mechanism. The second open end may be used for suctioning particulates or liquids ("materials") into the vacuum nozzle and the connected hose. The vacuum nozzle may include at least one air inlet apparatus coupled to the cylindrical body. The air inlet apparatus may have a first linear portion coupled along a length of the cylindrical body. The first oblong portion may have an open input end for receiving air. The air inlet apparatus may have a curved portion extending past and back into the second open end of the cylindrical body. The curved portion has an open output end for exhausting air into the second open end of the cylindrical body of the nozzle.

According to another aspect of the present disclosure, there is provided a valve coupled to the open input end of the linear portion of the air inlet apparatus for controlling air flow. Additional air can be allowed to flow into the hose, via the valve, to increase air flow and to increase air velocity to assist in carrying the materials to be vacuumed.

According to another aspect of the present disclosure, there may be provided a filter coupled to the second open end of the cylindrical body for filtering out solids when using the vacuum nozzle on liquids possibly containing solids. This may further protect the vacuum hose and vacuum from damage which may be caused by solids.

According to further aspects of the present disclosure, there is provided a method for utilizing the vacuum nozzle to reduce and potentially eliminate vacuum hose and vacuum nozzle pulsation, wherein the vacuum nozzle includes a first open end for coupling to a vacuum hose, an intake opening at a second open end, and an air inlet apparatus having a linear portion and a curved portion. The linear portion may have an open input for receiving air at a point distal the intake opening. The curved portion may have an open output for exhausting air into the second open end of the vacuum nozzle. The vacuum nozzle may be attached to the vacuum hose of the vacuum. Suction may be provided at an input end of the hose coupled to the vacuum nozzle using a coupling mechanism at the first open end of the vacuum nozzle. Air may be suctioned into the open input of the linear portion of the air inlet apparatus. Air may be exhausted from the curved portion into the intake opening at the second open end. The intake opening of the second open end of the vacuum nozzle may be inserted into a mass of particulate matter or body of liquid matter. Air may be suctioned via the air inlet apparatus and particulate matter or liquid matter into the intake opening at the second open end of the vacuum nozzle.

According to other aspects of the present disclosure, an air control valve may be provided at a point along the linear portion of the air inlet apparatus and controlling air flow into the second open end of the vacuum nozzle by adjusting the air control valve.

One advantage of implementations consistent with the present disclosure relates to providing an improved vacuum nozzle and method for introducing air into the nozzle which permits the reduction or elimination of pulsating of the vacuum hose and vacuum nozzle. The reduction or elimination of pulsating of the hose reduces wear on the components of the vacuum. The position of the open end of the linear portion of the air inlet apparatus allows for insertion of the vacuum nozzle into places where grain might collapse or is otherwise unsafe for human occupancy. Advantageously, as vacuum hose and vacuum nozzle pulsating is reduced or eliminated, operator safety increases because the hose is less likely to cause an operator to fall or grain or other particulate to shift and engulf the operator.

Another advantage of implementations consistent with the present disclosure relates to providing a consistent supply of air at the same opening where grain, particulates, liquids, or other matter enters the vacuum nozzle, while simultaneously moving the point where external air is taken in further away from the intake opening of the vacuum nozzle without incorporating an extra apparatus to manage such as an auxiliary air supply hose. This advantage introduces air into the intake opening in the same direction that the material is flowing and may allow for a greater intake rate. One advantage of dedicating part of the intake opening to inlet air is greatly stabilizing material intake rates. By rigidly moving the external air input opening further from the particulate intake while simultaneously moving the air output opening closer to the point of material collection, the present disclosure reduces the chance that grain, particulates, liquids, or other matter will enter the nozzle though the air inlet, allowing the vacuum nozzle to maintain a consistent air supply.

In a particular embodiment as discloser herein, a vacuum nozzle apparatus includes a main body and an auxiliary body. The main body has a first open end coupleable to a vacuum hose and has a second open end opposite the first open end. The first open end has a first profile and the second open end has a second profile. The main body includes a main passageway defined between the first open end and the second open end. The auxiliary body is coupled to an outer surface of the main body and extends along a majority of a length of the main body. The auxiliary body includes a first end portion and a second end portion. The first end portion has a first auxiliary opening positioned closer to the first open end of the main body than to the second open end of the main body. The second end portion has a second auxiliary opening covering a portion of the second open end of the main body. The second auxiliary opening is open to the main passageway. The auxiliary body includes an auxiliary passageway defined between the first auxiliary opening and the second auxiliary opening.

In an embodiment, the first profile shape is substantially the same shape as the second profile.

In an embodiment, the main body is linear in a longitudinal direction along the length of the main body.

In an embodiment, each of the first and second profiles are circular.

In an embodiment, the first profile differs in shape from the second profile.

In an embodiment, the main body includes a first portion, a second portion and a transition opening. The transition opening is positioned between the first portion and the second portion. The first portion includes a uniform cross-sectional profile between the first open end and the transition opening. The second portion includes a variable cross-sectional profile between the transition opening and the second open end.

In an embodiment, the second portion is positioned at an angle between 90 degrees and 180 degrees relative to the first portion.

In an embodiment, the first cross-sectional profile is cylindrical and the second cross-sectional profile is rectangular.

In an embodiment, the first profile has a first cross-sectional area and the second profile has a second cross-sectional area. The second cross-sectional area is substantially equal in size to the first cross-sectional area.

In an embodiment, the auxiliary body is coupled to an upper portion of the outer surface of the main body.

In an embodiment, the auxiliary body is shaped to match an upper profile of the main body defined by the upper portion of the outer surface.

In an embodiment, the second end portion of the auxiliary body extends at least partially beyond the second open end of the main body toward the first open end.

In an embodiment, the second end portion of the auxiliary body terminates flush with the second open end of the main body.

In an embodiment, the vacuum nozzle apparatus further comprises a valve coupled to the first auxiliary opening. The valve is configured to adjust a size of a first auxiliary opening cross-sectional area of the first auxiliary opening.

In an embodiment, the first auxiliary opening cross-sectional area is at least as great as a second auxiliary opening cross-sectional area of the second auxiliary opening when the valve is in a fully open position.

In an embodiment, the first open end of the main body includes a lip for coupling with the vacuum hose.

In a particular embodiment as discloser herein, a system for performing transport of materials includes a vacuum device, a vacuum hose, and a vacuum nozzle. The vacuum hose has a proximal end and a distal end. The distal end of the vacuum hose is coupled to the vacuum device. The vacuum nozzle is coupled to the proximal end of the vacuum hose. The vacuum nozzle includes a main body and one or more auxiliary air inlets. The main body has a first open end and a second open end. The first open end is open to and connected to the proximal end of the vacuum hose. Each auxiliary air inlet is coupled along at least a portion of a length of the main body. Each auxiliary air inlet is configured to receive air at a first opening positioned closer to the first open end of the main body than to the second open end of the main body. Each auxiliary air inlet is further configured to expel air from a second opening into the second open end of the main body. The second opening of each auxiliary air inlet blocks at least a portion of the second open end of the main body.

In a particular embodiment as discloser herein, a method for providing transport of materials includes: coupling a first open end of a main body of a vacuum nozzle to a vacuum hose; providing suction at a second open end of the main body via the vacuum hose; directing air into a first auxiliary opening of an auxiliary body coupled to the main body; directing air from the auxiliary body out of a second auxiliary opening of the auxiliary body into the second open end of the main body; suctioning material into the second open end of the main body; and providing the suctioned material to the vacuum hose.

In another embodiment, the method further comprises positioning the first auxiliary opening closer to the first open end of the main body than the second open end of the main body.

In another embodiment, the method further comprises covering at least a portion of the second open end of the main body with the second auxiliary opening.

In another embodiment, the method further comprises obstructing a portion of the first auxiliary opening to limit the amount of air flowing into the first auxiliary opening.

BEST MODE FOR CARRYING OUT THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
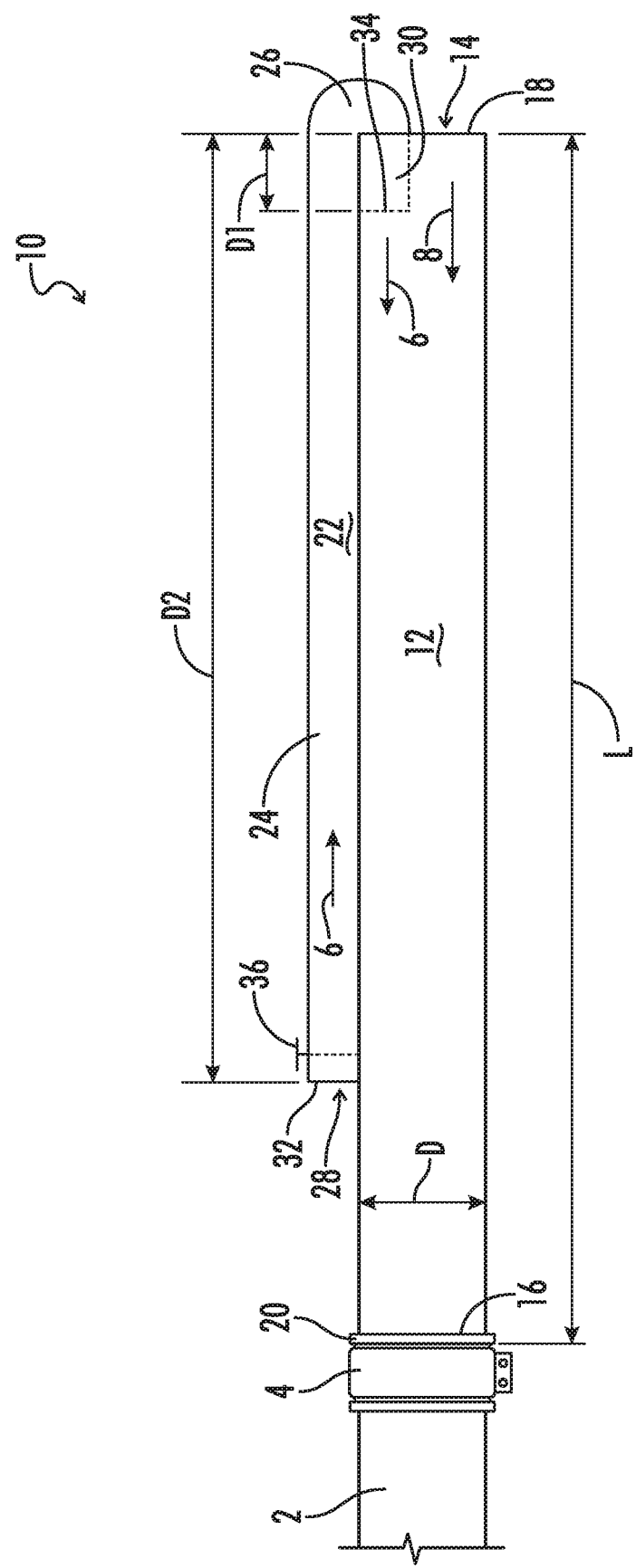
FIG. 1 illustrates side view of an exemplary embodiment of a vacuum nozzle in accordance with aspects of the present disclosure.
Figure 2:
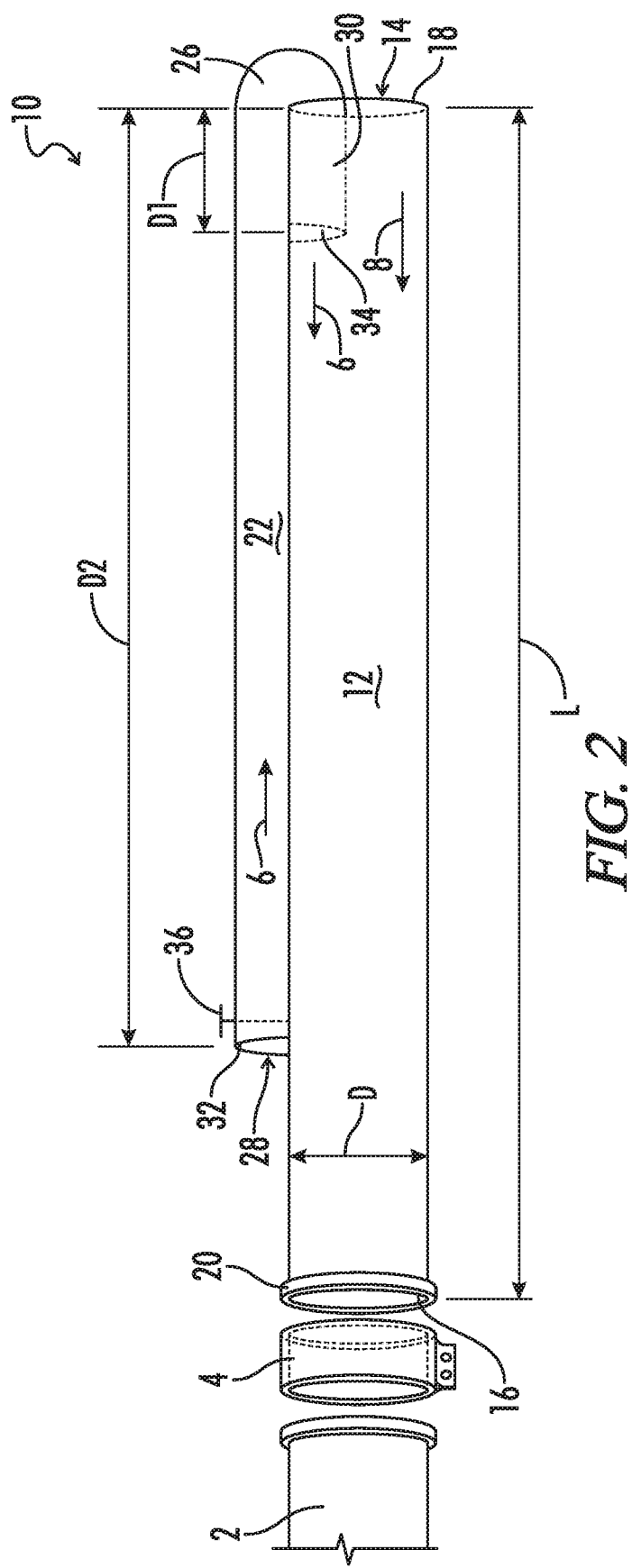
FIG. 2 illustrates a perspective top view of the vacuum nozzle of FIG. 1.
Figure 3:
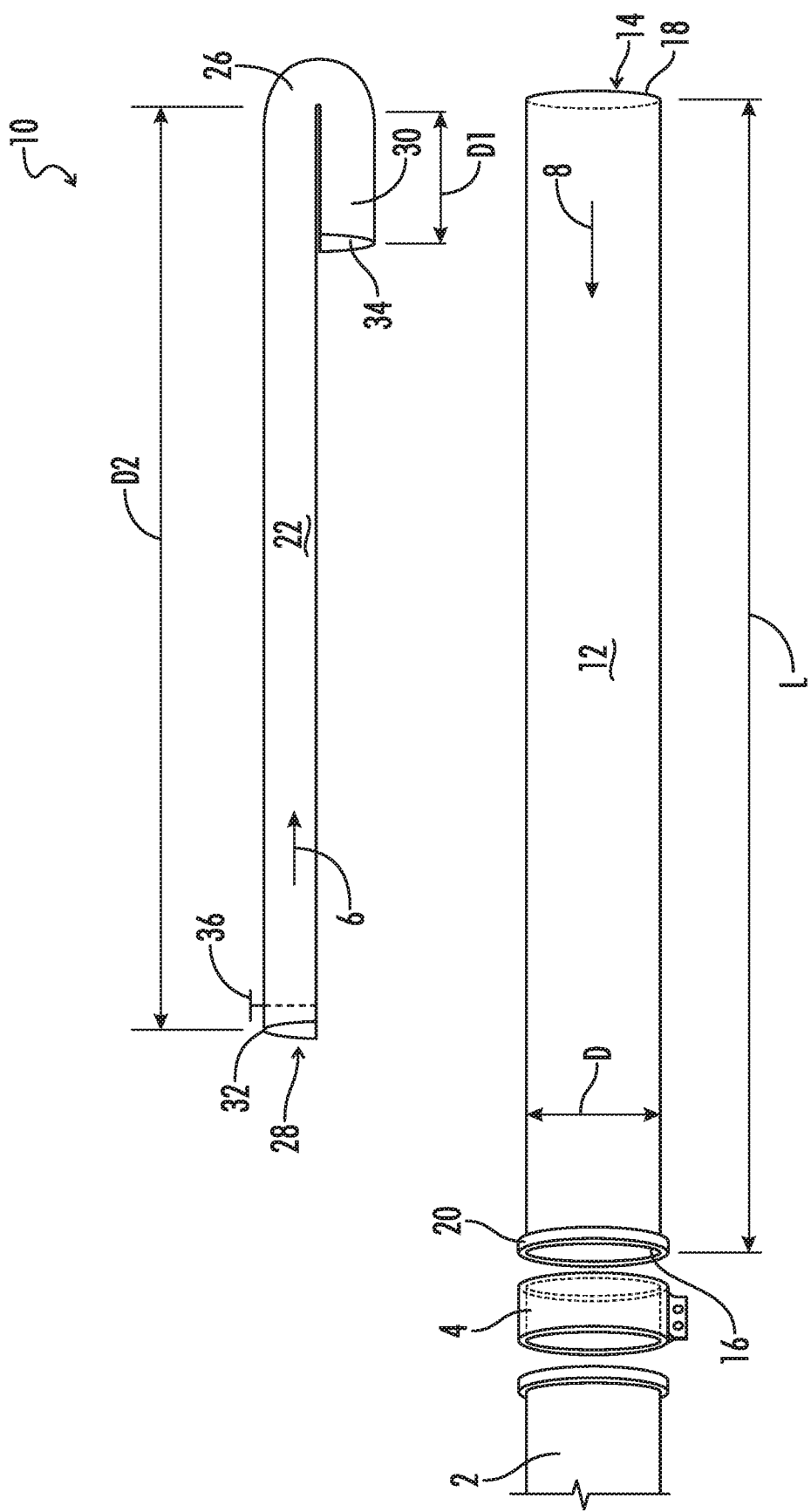
FIG. 3 illustrates a partial exploded view of the vacuum nozzle of FIG. 1.
Figure 4:
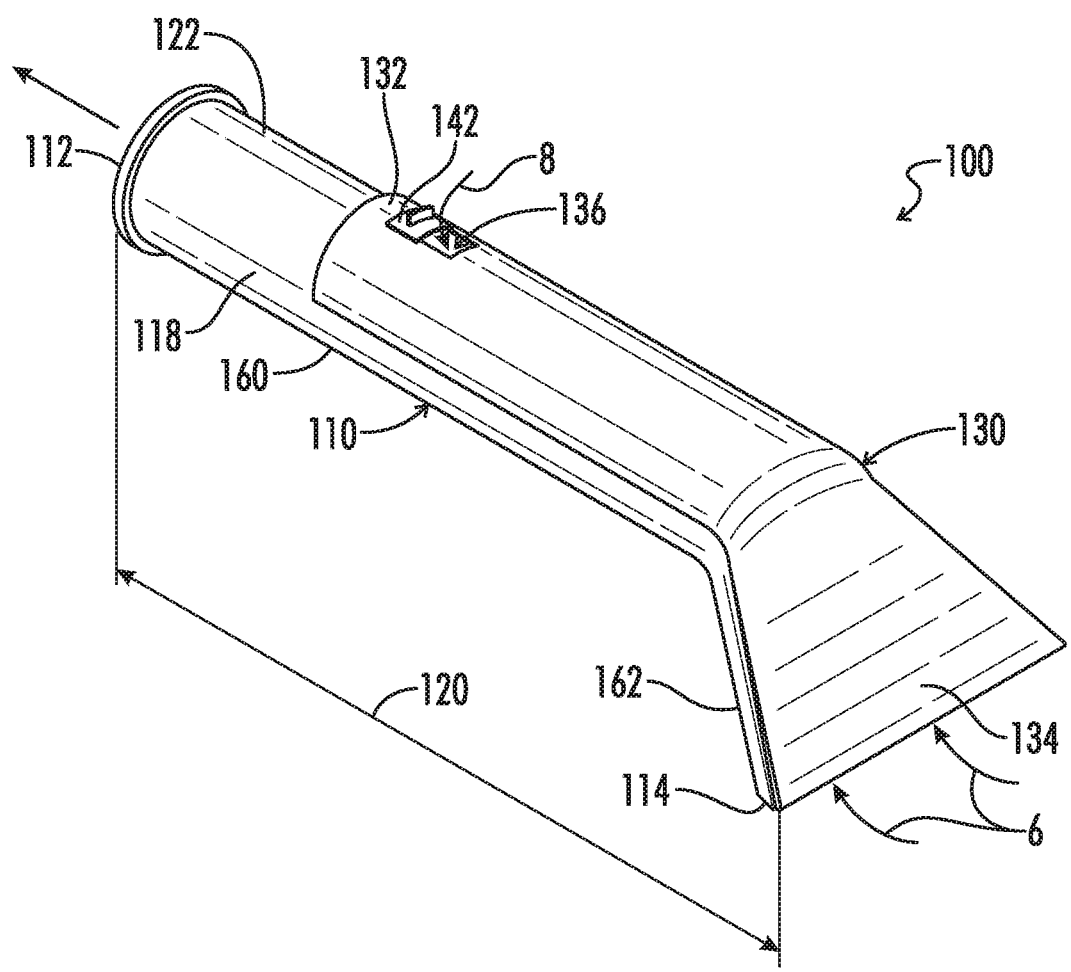
FIG. 4 illustrates a perspective view of an exemplary embodiment of a vacuum nozzle in accordance with aspects of the present disclosure.
Figure 5:
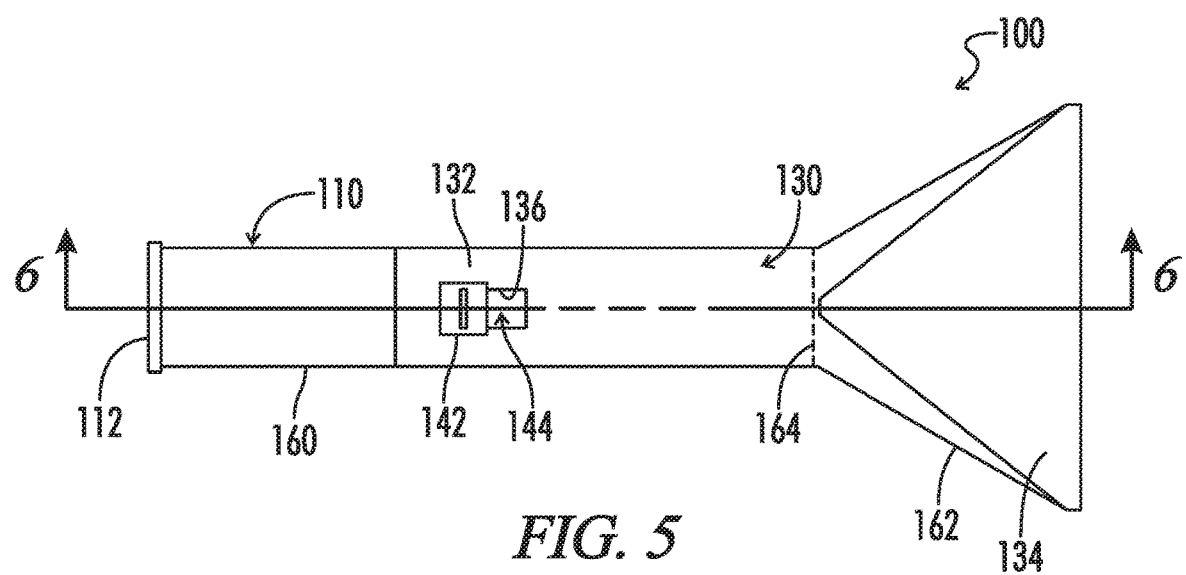
FIG. 5 illustrates a top plan view of the vacuum nozzle of FIG. 4.
Figure 6:
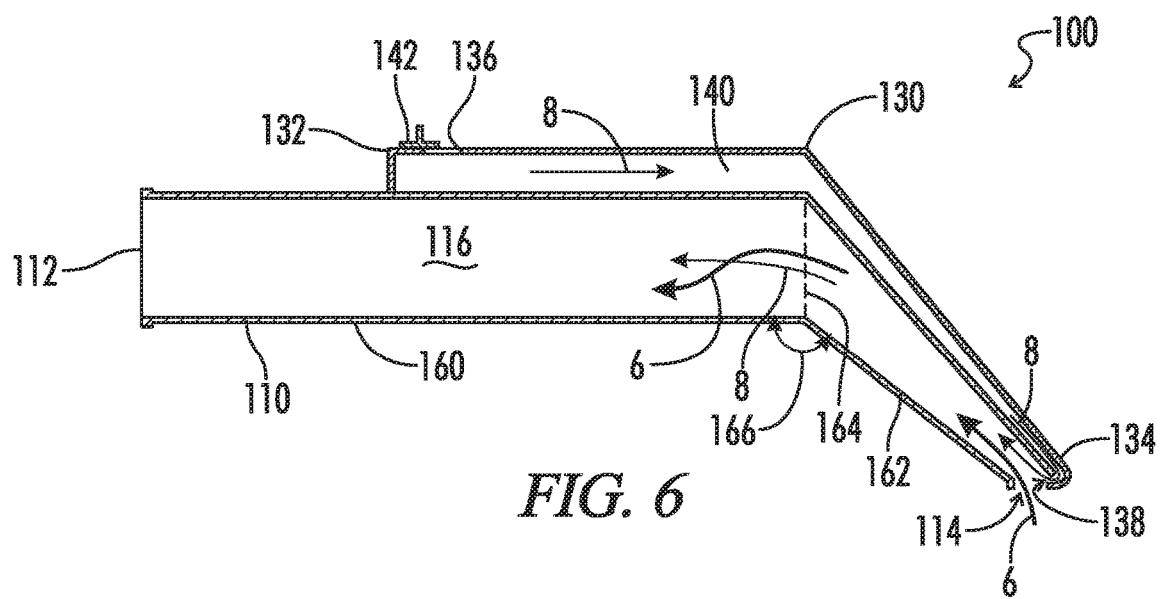
FIG. 6 illustrates a cross-sectional view of the vacuum nozzle of FIG. 4 taken along line 6-6 of FIG. 5.

Referring to FIG. 1, a short segment of one end of a vacuum hose 2 is illustrated, the vacuum hose 2 being further attachable to a vacuum device 1 (FIG. 9) which, when the vacuum is operational, provides suction via a vacuum motor 3 (FIG. 9) through the attached vacuum hose 2 to thereby draw materials 6 (the flow of which is represented by an arrow) and air 8 (the flow of which is represented by an arrow) through the vacuum hose 2 and into the vacuum device 1 for subsequent handling. The materials 6 as used herein may be grains, particulates, liquids, or other materials. In some embodiments, there may be multiple lengths of vacuum hose 2 connected end to end by a coupling member 4. In some embodiments, the coupling member 4 may be a hose clamp or the like. The vacuum hose 2 vary in diameter depending on the specific machine and manufacturer. The vacuum device 1 may include a particulate vacuum such as a grain bin vacuum, dry shop-vac, or other dry suction source. Additionally or alternatively, the vacuum device 1 may include a liquid vacuum such as a wet shop-vac, a hydro-vac attached to a truck, or any other liquid suction source.

A vacuum nozzle 10 according to an exemplary embodiment includes a nozzle body 12 and at least one air inlet member 22. The vacuum nozzle 10 may also be referred to herein as an vacuum nozzle apparatus 10. The vacuum nozzle 10 may can be used to receive materials 6. The nozzle body 12 may also be referred to herein as a main body 12. The at least one air inlet member 22 may also be referred to herein as an auxiliary body 22. The vacuum nozzle 10 may include the nozzle body 12 having a main passageway 14. The nozzle body 12 includes a cylindrically shaped body in the illustrated embodiment of FIG. 1, but may have a differently shaped body in various alternative embodiments (e.g., square, oval, triangular, or other shapes). In the illustrated embodiment, the nozzle body 12 includes a length (L) and diameter (D). Although illustrated as having a fixed diameter, the vacuum nozzle 10 may include a fixed or varying diameter along at least a portion of the length L of the nozzle body 12. The various embodiments, the vacuum nozzle 10 may be provided having different lengths and diameters, for example depending on a specific application or a specific machine module or manufacturer.

The nozzle body 12 may include a first open end 16 and a second open end 18 opposite the first open end 16. The first open end 16 may optionally include a protruded rim 20 shaped to couple to the vacuum hose 2 using a coupling member 4. Alternatively, the first open end 16 may not include the protruded rim 20 and may be attachable to the vacuum hose 2 by inserting the first open end 16 into the vacuum hose 2, for example using a hose clamp to secure the vacuum hose 2 to the vacuum nozzle 10. In other embodiments, the vacuum nozzle 10 and vacuum hose 2 may be coupled using any applicable configuration.

The second open end 18 of the nozzle body 12 may be used for drawing in grain, particulates, liquids, or other material into the vacuum device 1 using the vacuum hose 2. In some embodiments, the vacuum nozzle 2 may be used for drawing in liquids. When the second open end 18 of the nozzle body 12 is used for liquids, the nozzle body may include an optional filter attachment (not shown) for filtering out solids that may be found in liquids, such as heavy metals in sludge like liquid associated with fracking. In other embodiments, the vacuum nozzle 10 may be used for drawing in heavier matter such as gravel or the like.

The at least one air inlet member 22 having a linear portion 24 and a curved portion 26. In the illustrated embodiment, the linear portion 24 and the curved portion 26 are integrally formed together. In some embodiments, the linear portion 24 and the curved portion 26 may be separate pieces permanently attached together. In other embodiments, the linear portion 24 and the curved portion 26 may be separate removable, attachable pieces.

The linear portion 24 and the curved portion 26 have an auxiliary passageway 28 running therebetween. The linear portion 24 may have a semicircular body and may be attachable to the nozzle body 12 along at least a portion of the length L of the nozzle body 12. The linear portion 24 may include a flat side attachable to the nozzle body 12 is open before attachment. The flat side of the linear portion 24 may be attached to the nozzle body 12 as a continuous closed part of the linear portion 24. The shape and/or size of the linear portion 24 may differ in various embodiments (e.g., may be triangular, circular, square, etc.).

The curved portion 26 may be coupled between the linear portion 24 and the second open end 18 of the nozzle body 12. The curved portion 26 may be configured to extend past and back into the second open end 18 of the nozzle body 12. A free end 30 of the curved portion 26 may extend at least partially into the second open end 18 of the nozzle body 12 a distance D1. The free end 30 of the curved portion 26 includes an opening capable of exhausting air 8 into the second open end 18 of the nozzle body 12. The shape and/or size of the curved portion 26 may differ in various embodiments (e.g., may be triangular, V-shaped, square, etc.).

The auxiliary passageway 28 of the at least one air inlet member 22 is configured to draw air 8 into an open input 32 when the vacuum device 1 operates. The open input 32 is positioned a distance D2 from the second open end 18 of the nozzle body 12. The distance D2 is selected or otherwise configured to ensure or at least reduce the likelihood of particulates entering into the open input 32 of the at least one air inlet member 20. The auxiliary passageway 28 of the at least one air inlet member 22 is configured to exhaust air 8 while the vacuum device 1 is operational at an open output 34 located at the free end 30 of the curved portion 26. The position of the open output 34 relative to the second open end 18 may be configured to provide a stream of air 8 at a point located proximate to where the material 6 enters into the second open end 18 of the nozzle body 12. A constant, uninterrupted supply of air 8 may be provided due to curved portion 26 and associated open output 34 occupying a portion of the opening of the second open end 18 of the nozzle body 12.

The vacuum nozzle 10 may include a valve 36, optionally positioned at the linear portion 26 of the at least one air inlet member 22 for controlling at least one of air flow and air velocity within the nozzle body 12. In the illustrated embodiment, the valve 36 is a butterfly valve shaped complimentary to the auxiliary passageway 28 of the at least one air inlet member 22. Adjusting the rate of air flow via the valve 36 may change the rate of material flow through the vacuum nozzle 10 and may also affect the effectiveness of the vacuum nozzle 10 at suctioning larger and heavier materials. In some embodiments, the valve 36 may be a gate valve, a ball valve, a globe valve, or any other device capable of regulating at least one of air flow and/or velocity. In various other embodiments, the valve 36 may be a typical air slide disposed over the open input 32 of the linear portion 24 of the at least one air inlet member 22.

The at least one air inlet member 22 may be integrally formed into the nozzle body 12. In other embodiments, the nozzle body 12 may have a laterally open window (not shown) formed on a side of the nozzle body 12 opening into the second open end 18 of the nozzle body 12 and the at least one air inlet member 22 may extend and feed air 8 through the laterally open window.

The at least one air inlet member 22 may include an attachment mechanism (not shown) to be attached to the end of the vacuum hose 2. This may enable the air inlet "nozzle" to be universally compatible with any vacuum hose 2 or vacuum device 1.

Referring to FIGS. 4-9, a vacuum nozzle 100 according to an exemplary embodiment is provided. The vacuum nozzle 100 may also be referred to herein as an vacuum nozzle apparatus 100. The vacuum nozzle 100 functions similarly to the vacuum nozzle 10 in an exemplary embodiment. The vacuum nozzle 100 may can be used to receive materials 6. The vacuum nozzle 100 includes a main body 110 and at least one auxiliary body 130. The main body 110 may also be referred to herein as a nozzle body 110. An auxiliary body 130 may also be referred to herein as an air inlet member 130. The main body 110 of the vacuum nozzle 100 may include a first open end 112 and a second open end 114 positioned opposite from the first open end 112 although not required to be opposite in various embodiments. The first open end 112 may be coupled to a vacuum hose 2. The main body 110 may further include a main passageway 116. The main passageway 116 may be defined at least partially between the first open end 112 and the second open end 114.

The auxiliary body 130 may be coupled to an outer surface 118 of the main body 110. The auxiliary body 130 may optionally extend along a majority of the length 120 of the main body 110, or along any portion thereof.

The auxiliary body 130 may include a first end portion 132 and a second end portion 134. The first end portion 132 may include a first auxiliary opening 136. The first auxiliary opening 136 may be referred to herein as an open input 136. The first auxiliary opening 136 may be positioned closer to the first open end 112 of the main body 110 then to the second open end 114 of the main body 110. The second end portion 134 may extend beyond the second open end 114 of the main body 110 and may optionally curve back to cover a portion of the second open end 114. The second end portion 134 may include a second auxiliary opening 138. The second auxiliary opening 138 may also be referred to herein as an open output 138. The second auxiliary opening 138 may extend over a portion of the second open end 114 of the main body 110 and may be open to the second open end 114. In the illustrated embodiment, the second auxiliary opening 138 terminates flush with the second open end 114 of the main body 110. In various embodiments, the second end portion 134 and associated second auxiliary opening 138 extends partially into the main passageway 116 through the second open end 114. The auxiliary body 130 may further include auxiliary passageway 140 defined between at least a portion of the first auxiliary opening 136 and the second auxiliary opening 138.

In the illustrated embodiment, the auxiliary body 130 is coupled to an upper portion 122 of the outer surface 118 of the main body 110. The auxiliary body 130 may be shaped to match an upper profile 124 of the main body 110 defined by the upper portion 122.

The auxiliary body 130 may include a valve 142 coupled to the first auxiliary opening 136. The valve 142 may be configured to adjust a size of a first auxiliary opening cross-sectional area 144 of the first auxiliary opening 136. The valve 142 may function similarly to the valve 36 of the vacuum nozzle 10 discussed above. In the illustrated embodiment, the valve 142 is a slide valve, however, in other embodiments, different valve(s) or other adjustment device(s) may be used. The second auxiliary opening 138 may have a second auxiliary opening cross-sectional area 146. The first auxiliary opening cross-sectional area 144 may be at least as great as the second auxiliary opening cross-sectional area 146 to ensure that the valve when fully open (or in a fully open position) does not restrict air 8 as it flows from the first auxiliary opening 136 to the second auxiliary opening 138.

Figure 9:
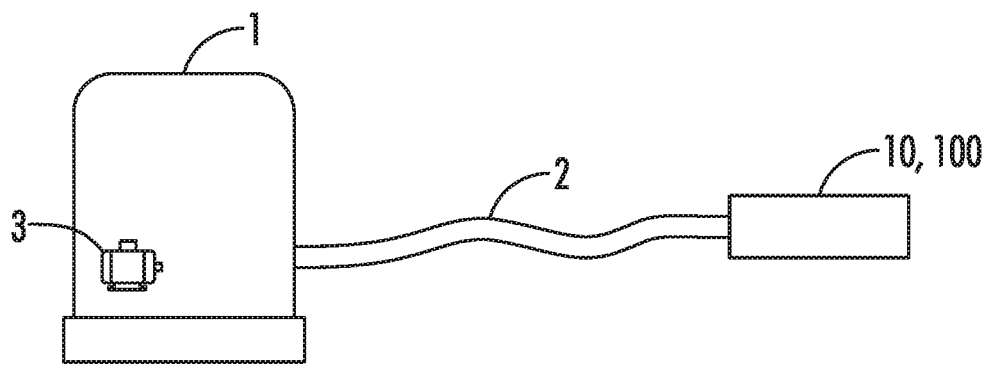
FIG. 9 is a block diagram of a system for providing transport of materials in accordance with aspects of the present disclosure.

When in use, the vacuum nozzle 100 is attached at its first open end 112 to the vacuum hose 2 which extends from a vacuum device 1 (FIG. 9). A system for providing transport of materials 6 includes the vacuum device 1, the vacuum hose 2, and the vacuum nozzle 10/100. When operational, the vacuum device 1 supplies suction via a vacuum motor 3 (FIG. 9) to the vacuum hose 2 and associated vacuum nozzle 100. The vacuum nozzle 100 is configured to receive materials 6 (the direction of flow being indicated by an arrow in FIGS. 4 and 6) through the second open end 114 of the main body 110 and to dispel the received material 6 out of the first open end 112 of the main body 110 to then be transferred through the vacuum hose 2 to the vacuum device 1. The vacuum device 1 may either collect the materials 6 or exhaust them, for example into a transport truck (not shown). When operational, the auxiliary body 130 receives air 8 (the direction of flow being indicated by an arrow in FIGS. 4 and 6) through the first auxiliary opening 136 and exhausts the air 8 out of the second auxiliary opening 138. The air 8 being exhausted is mixed with material 6 received through the second open end 114 of the main body 110 to thereby increase flow rates of materials 6 through the vacuum nozzle 100 and vacuum hose 2. The disclosed configuration also reduces wear on the vacuum motor 3 of the vacuum device 1 by helping to maintain a consistent flow rate via its introduction of air 8 proximate to a point at which materials 6 are suctioned (e.g., the second open end 114 of the main body 110). This configuration may also greatly reduce and even eliminate pulsation and movement of the vacuum hose 2 during operation.

Figure 7:
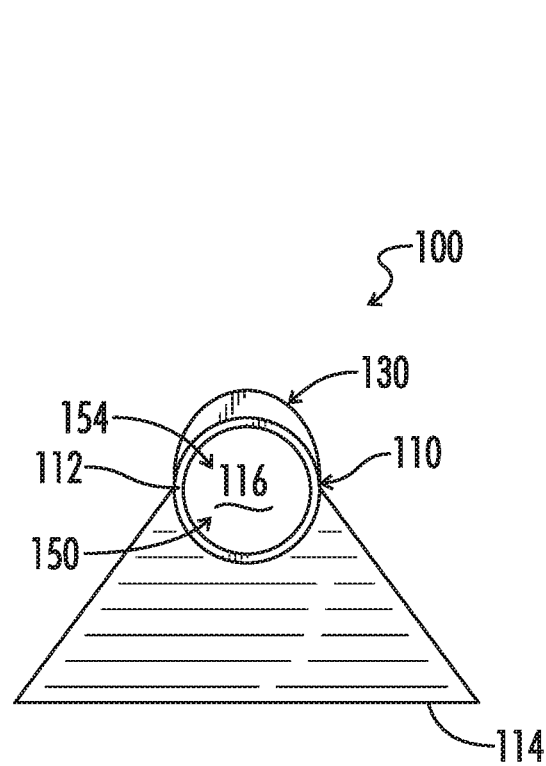
FIG. 7 illustrates a rear elevation view of the vacuum nozzle of FIG. 4.
Figure 8:
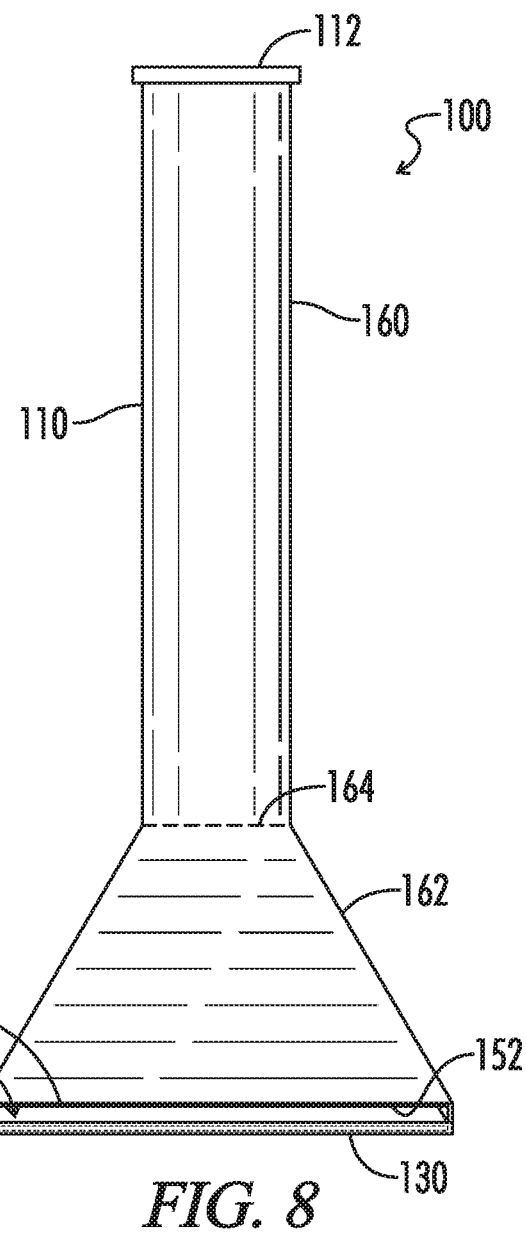
FIG. 8 illustrates a bottom plan view of the vacuum nozzle of FIG. 4.

As shown by FIGS. 7 and 8, the first open end 112 of the main body 110 may have a first profile 150 (e.g., a cross-sectional profile) and the second open end 114 of the main body 110 may have a second profile 152 (e.g., a cross-sectional profile). In various embodiments, the first profile 150 of the first open end 112 and second profile 152 of the second open end 114 differ. In the embodiments illustrated by FIGS. 4-9, the first profile is a cylinder and the second profile is a rectangle, although any shapes may be used consistent with the present disclosure.

The main body 110 may include a first portion 160 and a second portion 162. The first portion 160 may be defined between at least a portion of the first open end 112 and a transition opening 164. The second portion 162 may be defined between at least a portion of the transition opening 164 and the second open end 114. As illustrated, the first portion 160 may have a uniform cross-sectional profile matching the first profile 150. The second portion 162 may have a variable cross-sectional profile which changes from the first profile 150 at the transition opening 164 to the second profile 152 at the second open end 114.

The second portion 162 of the main body 110 may be positioned at an angle 166 relative to the first portion 160. In an exemplary embodiment, the angle 166 may be between ninety and one-hundred-eighty degrees when measured from the first portion 160 although any angle may be used. The angle 166 repositions the second open end 114 so that the vacuum nozzle 100 is better able to pick up materials 6 off of a flat surface while the first portion 160 of the main body is substantially parallel with the flat surface.

The first profile 150 may have a first cross-sectional area 154. The second profile 152 may have a second cross-sectional area 156. The first cross-sectional area 154 may be substantially equal in size to the second cross-sectional area 156. This ensures that any suction applied at the first open end 112 is substantially the same at the second open end 114. If the first cross-sectional area 154 is larger than the second cross-sectional area 156, then the suction at the second open end 114 will be greater than the suction at the first open end 112. If the first cross-sectional area 154 is smaller than the second cross-sectional area 156, then the suction at the second open end 114 will be less than the section at the first open end 112.

A method is provided for using a vacuum nozzle 100. The method of using the vacuum nozzle 10 is at least similar, thus, for simplicity reference will only be made to the vacuum nozzle 100. The method includes at least one of: (i) coupling the first open end 112 of the main body 110 of the vacuum nozzle 100 to a vacuum hose 2 coupled to a vacuum device 1, (ii) providing suction at the second open end 114 of the main body 110, (iii) directing air 8 into the first auxiliary opening 136 of the auxiliary body 130 coupled to the main body 110 along a majority of the length 120 of the main body 110, and/or (iv) directing the air 8 from the auxiliary body 130 out of the second auxiliary opening 138 of the auxiliary body 130 into the second open end 114 of the main body 110.

At least one of material 6 and/or air 8 may be suctioned into the second open end 114 of the main body 110.

A amount of air 8 flowing into the first auxiliary opening 136 may be limited using the valve 142 to alter the size of the first auxiliary opening 136.

Implementations consistent with the present disclosure may be used in numerous fields. For example, in one exemplary embodiment, the vacuum nozzle 10/100 may be coupleable to a vacuum hose 2, or a vacuum device 1 via the vacuum hose 2, and used to transport grain from a grain bin to an external storage source, such as a vehicle used to transport the grain from the grain bin. In another embodiment, the vacuum nozzle 10/100 may be coupleable to a hydrovac truck and/or may attached to the vacuum device 1 and used to clean a storage space of the hydrovac truck. In embodiments where liquid may be or is intended to be transported via the vacuum nozzle 10/100, at least a portion of the diameter of the second open end 18/114 may be configured to be adjustable. For example, an adapter (not illustrated) may be placed over or otherwise associated with the second open end 18/114. The adapter may be a fixed size or shape, or may be a configurable size or shape in various embodiments.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A vacuum nozzle apparatus for providing transport of material comprising:
    a main body having a first open end coupleable to a vacuum hose and a second open end opposite the first open end, the first open end having a first profile and the second open end having a second profile, the main body including a main passageway defined between the first open end and the second open end; and
    an auxiliary body coupled to an outer surface of the main body and extending along a majority of a length of the main body, the auxiliary body having a first end portion and a second end portion, the first end portion having a first auxiliary opening positioned closer to the first open end of the main body than to the second open end of the main body, the second end portion having a second auxiliary opening covering a portion of the second open end of the main body wherein the second auxiliary opening either (i) terminates flush with the second open end of the main body or (ii) extends partially into the main passageway through the second open end of the main body, the second auxiliary opening open to the main passageway, the auxiliary body including an auxiliary passageway defined between the first auxiliary opening and the second auxiliary opening.

2. The vacuum nozzle apparatus of claim 1, wherein:
    the first profile is substantially the same shape as the second profile.

3. The vacuum nozzle apparatus of claim 1, wherein:
    the main body is linear in a longitudinal direction along the length of the main body.

4. The vacuum nozzle apparatus of claim 1, wherein:
    the first profile differs in shape from the second profile.

5. The vacuum nozzle apparatus of claim 1, wherein:
    the main body includes a first portion, a second portion and a transition opening positioned between the first portion and the second portion;
    the first portion includes a uniform cross-sectional profile between the first open end and the transition opening; and
    the second portion includes a variable cross-sectional profile between the transition opening and the second open end.

6. The vacuum nozzle apparatus of claim 5, wherein:
    the second portion is positioned at an angle between 90 degrees and 180 degrees relative to the first portion.

7. The vacuum nozzle apparatus of claim 1, wherein:
    the first profile has a first cross-sectional area;
    the second profile has a second cross-sectional area; and
    the second cross-sectional area is substantially equal in size to the first cross sectional area.

8. The vacuum nozzle apparatus of claim 1, wherein:
    the auxiliary body is coupled to an upper portion of the outer surface of the main body.

9. The vacuum nozzle apparatus of claim 8, wherein:
    the auxiliary body is shaped to match an upper profile of the main body defined by the upper portion of the outer surface.

10. The vacuum nozzle apparatus of claim 1, wherein:
    the second end portion of the auxiliary body extends at least partially beyond the second open end of the main body toward the first open end.

11. The vacuum nozzle apparatus of claim 1, wherein:
    the second end portion of the auxiliary body terminates flush with the second open end of the main body.

12. The vacuum nozzle apparatus of claim 1, further comprising a valve coupled to the first auxiliary opening, the valve configured to adjust a size of a first auxiliary opening cross-sectional area of the first auxiliary opening.

13. The vacuum nozzle apparatus of claim 12, wherein:
    the first auxiliary opening cross-sectional area is at least as great as a second auxiliary opening cross-sectional area of the second auxiliary opening when the valve is in a fully open position.

14. The vacuum nozzle apparatus of claim 1, wherein:
    the first open end of the main body includes a lip for coupling with the vacuum hose.

15. The vacuum nozzle apparatus of claim 1, wherein the second auxiliary opening extends partially into the main passageway through the second open end of the main body.

* * * * *